INVENTOR.
WILLIS L. LIPSCOMB
BY Knox & Knox

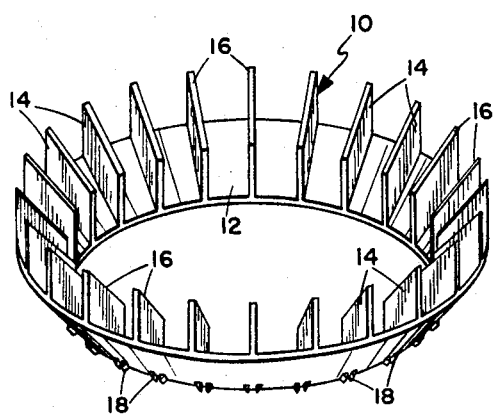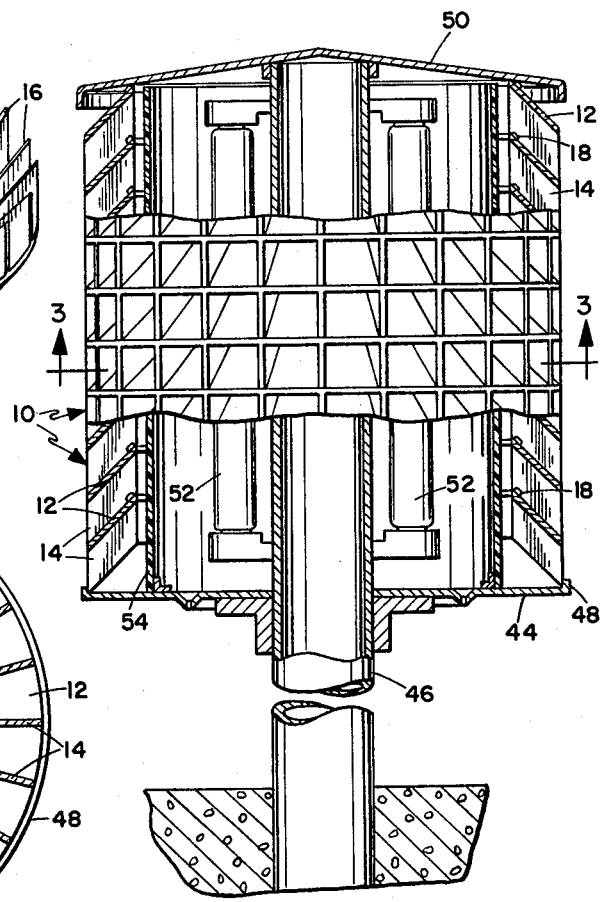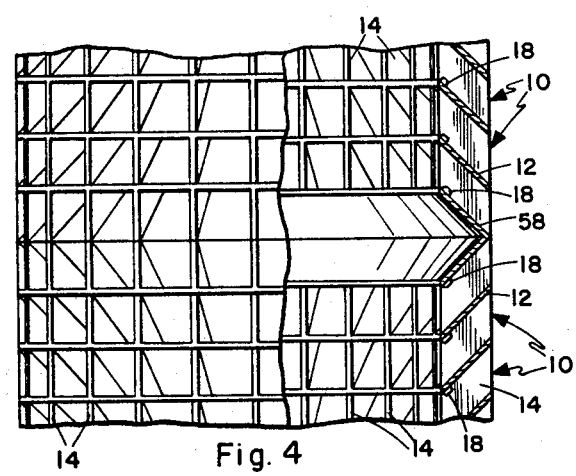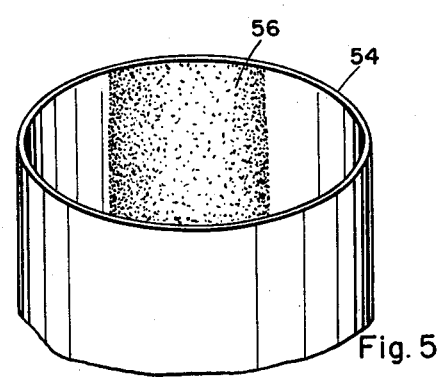
Fig. 1
Fig. 2
Fig. 3
Fig. 4
Fig. 5
INVENTOR.
WILLIS L. LIPSCOMB
BY Knox & Knox INVENTOR.
WILLIS L. LIPSCOMB
BY Knox & Knox June 25, 1968  W. L. LIPSCOMB  3,390,263
COLUMNAR CELLULAR LOUVER LIGHT CONTROL UNIT Filed Aug. 22, 1966  4 Sheets-Sheet 3

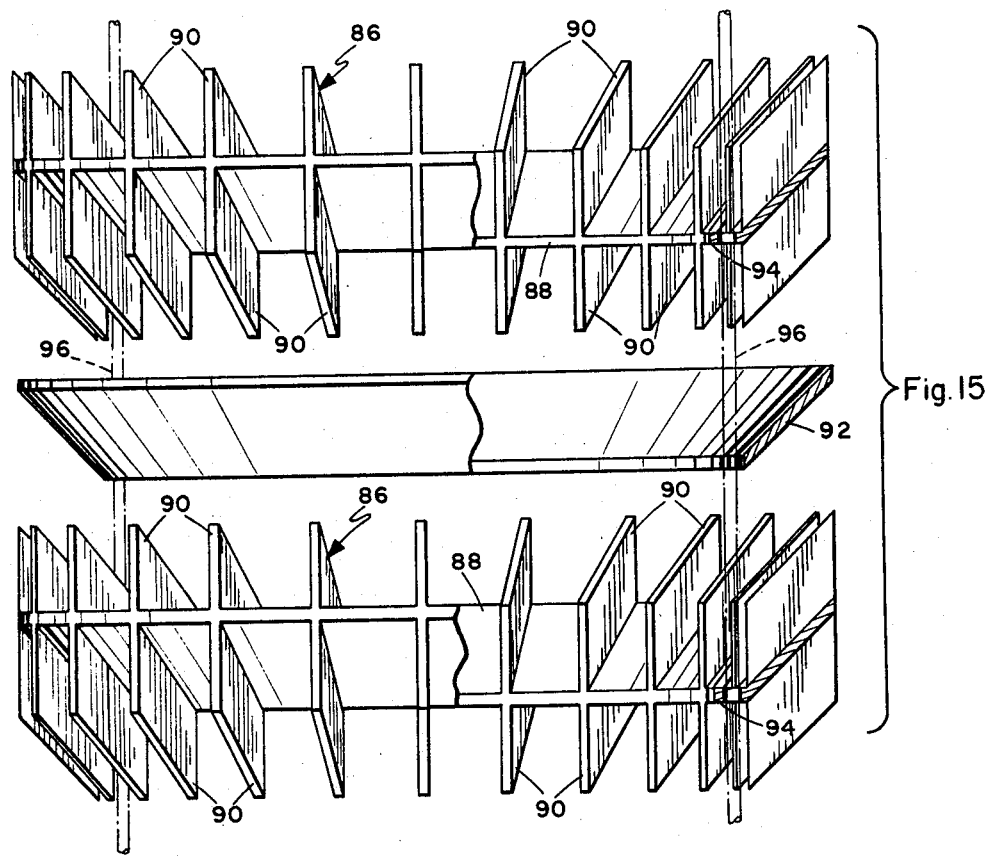
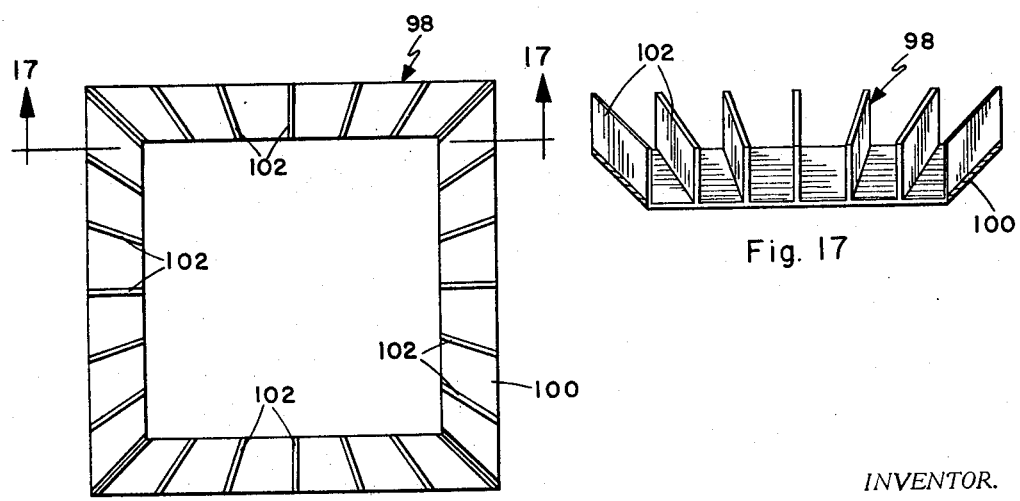
Fig. 15
Fig. 16
Fig. 17
INVENTOR.
WILLIS L. LIPSCOMB
BY Knox & Knox United States Patent Office 3,390,263
Patented June 25, 1968

3,390,263
COLUMNAR CELLULAR LOUVER LIGHT
CONTROL UNIT
Willis L. Lipscomb, 2208 Willow St.,
San Diego, Calif. 92106
Filed Aug. 22, 1966, Ser. No. 574,009
9 Claims. (Cl. 240—108)

ABSTRACT OF THE DISCLOSURE

A columnar light control unit formed from stacked louver elements each of which is a dished plate ring with vertical unitary vanes extending radially on one side of the plate. There are registering means on the plates for direct interengagement with doubly dished plates enabling assembly with a number of the louver elements inverted. A shield is also arranged between the central source of light and the louver elements which has portions thereof reflective and other portions translucent for directional control of emitted light.

---

Figure 6:
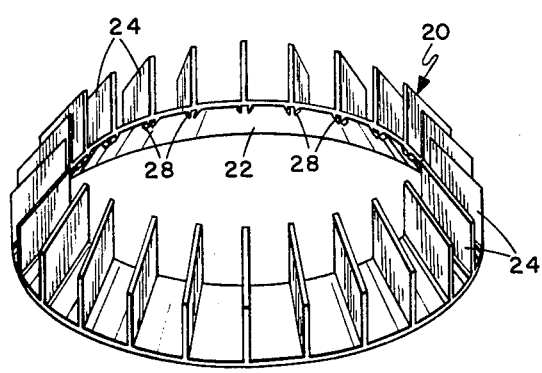

The present invention relates to lighting fixtures and specifically to a light control unit incorporating a stack of interfitting vaned plate cellular louver elements.

Cellular or louvered light control panels, in flat or curved configurations, are normally made as complete panels of specific size, each requiring a complex and expensive mold or die for manufacture.

The light control unit described herein has its primary structure built up from a number of louver elements, largely uniform, made from simple molds or dies and can be assembled in any desired length. The unit can be recticylindrical, semi-cylindrical, one quarter or three quarters of a cylinder, or other cylindroidal form such as a multi-sided columnar structure and may be mounted on a suitable support as a free standing fixture, suspended in any convenient manner, or attached to a wall or other supporting surface. The louvers are inclined for directional shielding of direct light and the fixtures can readily incorporate a weatherproofing element which may have a secondary use as zone control of emitted light. The louver elements interfit to form a stable self-supporting stack and are easily dismantled for cleaning, although permanent assembly or locking means may be used if desired.

Figure 9:
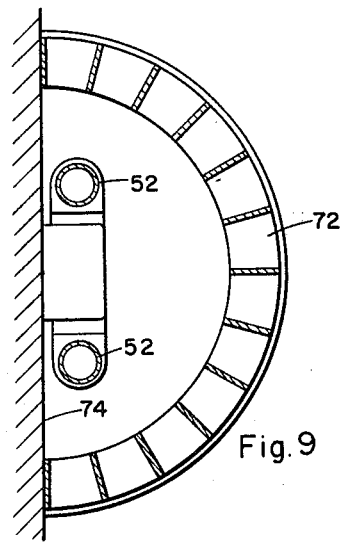
Figure 7:
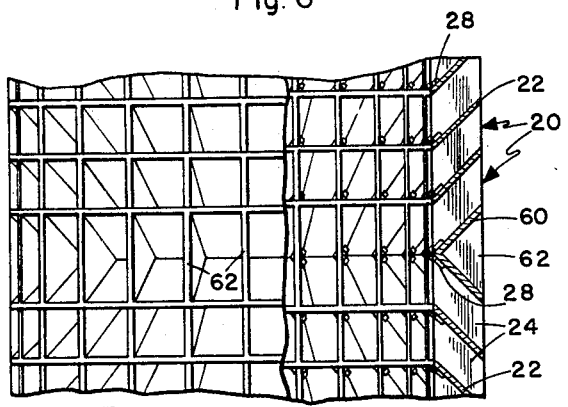
Figure 8:
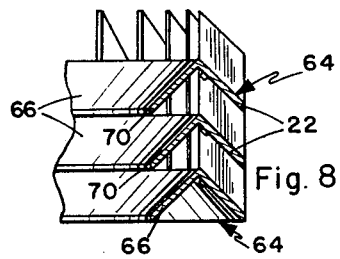
Figure 10:
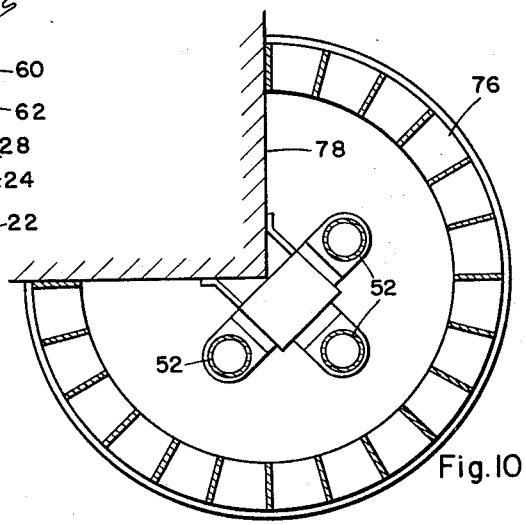
Figure 11:
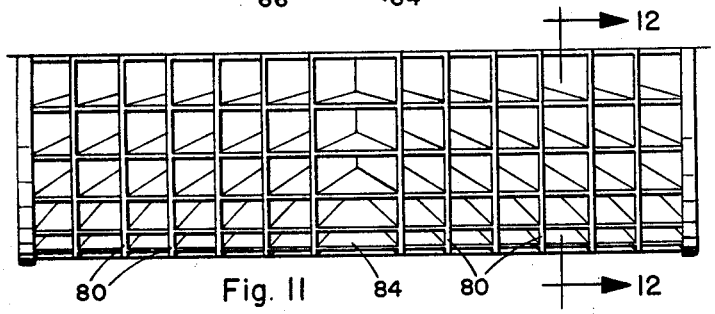
Figure 12:
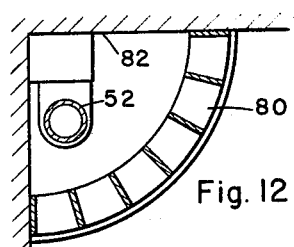
Figure 13:
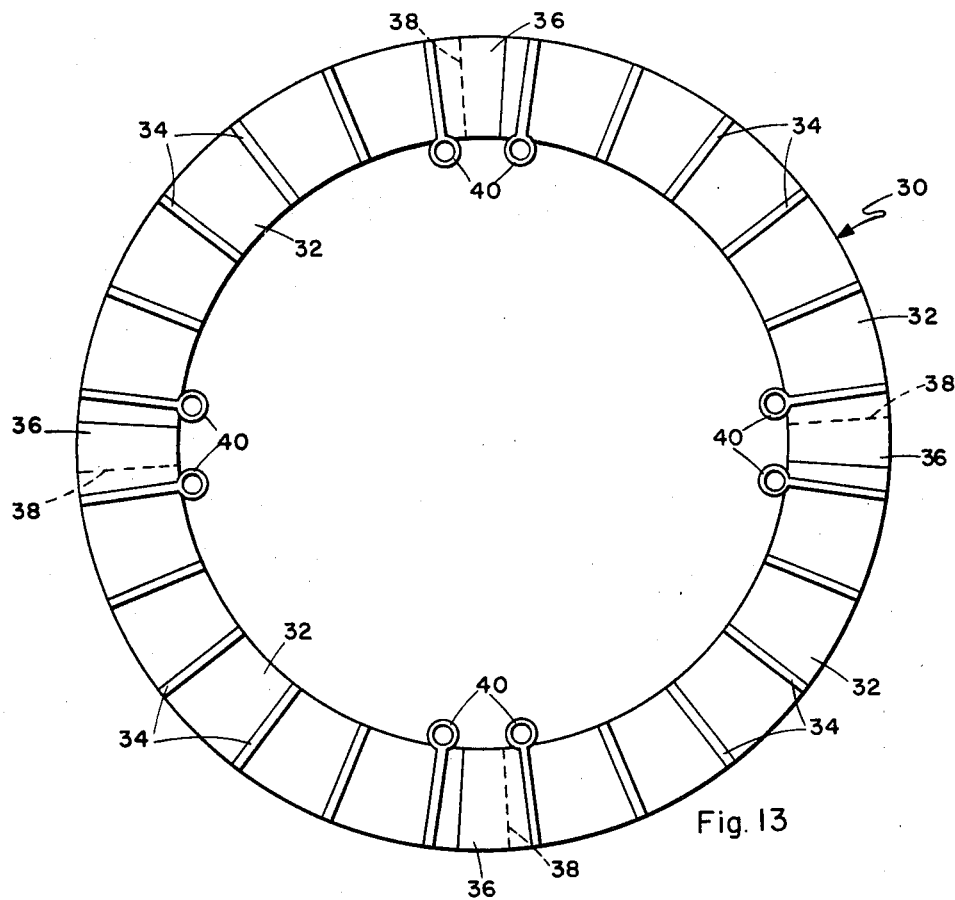
Figure 14:
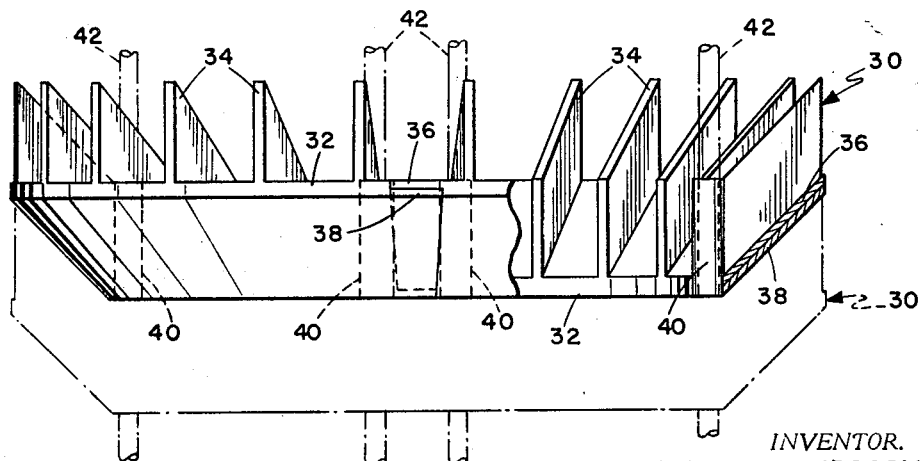

The basic louver elements and typical fixture assemblies are illustrated in the drawings, in which:

FIGURE 1 is a perspective view of a louver element;
FIGURE 2 is a partially sectioned side elevation view of a free standing light fixture using the louver elements;
FIGURE 3 is a sectional view taken on line 3—3 of FIGURE 2;
FIGURE 4 is a partially sectioned side elevation view of a louver assembly with an adapter to connect louvers inclined in opposite directions;
FIGURE 5 is a fragmentary perspective view of the inner liner for the fixture of FIGURE 2;
FIGURE 6 is a perspective view of an alternative louver element;
FIGURE 7 is a view similar to FIGURE 4, but using the louver elements of FIGURE 6;
FIGURE 8 is a fragmentary sectional view similar to a portion of FIGURE 7, showing shielding flanges incorporated in the louver elements;
FIGURE 9 is a sectional view similar to FIGURE 3, but showing a semi-cylindrical fixture;
FIGURE 10 is a further similar sectional view of a three quarters cylindrical fixture;
FIGURE 11 is a front elevation view of a cove type quarter cylindrical fixture;
FIGURE 12 is a sectional view taken on line 12—12 of FIGURE 10;
FIGURE 13 is a top plan view of a large louver element composed of interconnected quadrant pieces;
FIGURE 14 is a partially sectioned side elevation view of a structure of FIGURE 13, showing the method of assembly;
FIGURE 15 is an exploded side elevation view, partially sectioned, of a louver element having vanes on both faces thereof;
FIGURE 16 is a top plan view of one example of a noncircular louver element; and
FIGURE 17 is a sectional view taken on line 17—17 of FIGURE 16.

Similar characters of reference indicate similar or identical elements and portions throughout the specification and throughout the views of the drawings.

The basic louver element comprises an inclined plate and vanes on at least one face of the plate but the louver element may vary in shape as viewed in plan and the stacked assembly will, of course, have a corresponding horizontal cross-sectional shape. A cursory inspection of FIGURES 1, 9, 10, 12 and 16–17 will indicate the concept herein of louver elements of various shapes which stacked together provide columns of corresponding shapes. An exemplary louver element is shown in FIGURE 1 and comprises a plate 12 which is a generally frusto-conical band or ring with a plurality of circumferentially spaced radial vanes 14 extending axially from one side or face thereof. As illustrated the plate 12 is a portion of a hollow cone, with the vanes 14 on the inner surface, each vane being of parallelogram form with the edge 16 of the vane remote from the plate parallel to the plane of the plate at that vane. The inner and outer edges of the vanes are parallel to the axis of the plate 12. On the outer surface of the frusto-conical plate 12 are a plurality of slotted ribs 18, one at each vane position, to receive the vane edges 16 of the next successive louver element 10 and so to hold the two elements in aligned position. When a number of louver elements are stacked in this manner a cylindrical or columnar louver structure is produced, with the vanes forming longitudinal slats and the outer edges of the plates forming the lateral or circumferential slats of a cellular configuration. Ribs 18 may extend across the full width of plate 12, or be confined to one edge of the plate as shown.

An alternative louver element 20, illustrated in FIGURE 6, is similar in all respects except that the vanes 24 are on the outer surface of the plate 22 and the slotted ribs 28 are on the inner surface thereof.

For large louver elements it may be desirable to make each element in several pieces, in order to avoid the cost of a large die. This can be accomplished, as shown in FIGURES 13 and 14, by dividing the louver element 30 into a plurality of equal sectors, each having a plate 32 with plate-like vanes 34. The plate of each sector extends beyond the end most vane to join with the next adjacent sector, the ends having interfitting half lap portions 36 and 38 to overlap and form a smooth continuation of the composite plate. Using one half lap portion recessed on the top surface and the other on the same plate sector recessed on the under surface, the several identical sectors can be joined to make a louver element. To ensure alignment and to eliminate special fastenings the end most vanes 34 of each sector have tubular sleeves 40 integral with and parallel to their inner edges. When the louver elements 30 are stacked, tie rods 42 can be passed through the openings provided by the aligned sleeves 40, as in broken line in FIGURE 14, to secure the louver elements in stacked assembly. The four piece louver element shown is merely an example and each element could be made up from any convenient number of pieces.

Each of the louver elements thus far described has the same basic structure of an inclined plate with axially extending vanes on one side. The minor differences, illustrated make the elements adaptable to a variety of lighting fixtures as hereinafter described. The space within the stacked louver elements, that is, within the columnar light control unit, is employed, of course for lighting equipment such as the lamps 52.

A typical fixture is illustrated in FIGURES 2 and 3, in which a stacked assembly of louver elements 10 is supported on a circular base plate 44 which is fixed on a central post 46. An annular flange 48 on base plate 44 will hold the louver elements in axial alignment. The post can be embedded in the ground or supported in any suitable manner, with the fixture at the required height. Post 46 extends to the top of the fixture and carries a top cap 50 which completely covers the upper end of the cylindrical fixture and serves to clamp the stacked louver elements in place. Lamps 52 can be mounted on the post 46 or arranged in any convenient manner within the fixture. If the fixture is to be used outdoors the lamps may be protected from rain by an imperforate shield transversely configured to suit the particular unit and illustrated in the cylinder 54, of translucent or transparent material mounted concentrically inside the fixture and extending the full height thereof in the space defined within the stacked louver elements.

The louver elements may be of metal, plastic, or other readily formable material and can be opaque or translucent to any desired degree with any suitable surface finish, depending on the particular use and control of light required. To provide directional control of light, portions of the inner surface of shield 54 may be made opaque or have a reflective coating 56, as in FIGURE 5, which may be partially or fully reflective.

The inclined configuration of the louver cells provides directional control of direct light which, in the case of the fixture of FIGURE 2, would give maximum direct light downwardly in the area around the base of the fixture. To direct light upwardly the louver elements could easily be inverted. A further arrangement which provides both upward and downward direct light is shown in FIGURE 4, wherein a portion of the stack of louver elements 10 is inverted. At the transition an adapter louver 58 is used to connect the oppositely inclined louvers 10 and 10, the adapter louver being V-shaped in cross section with the apex of the V outward. To ensure continuation of the cellular pattern the inner edges of the adapter louver 58 have slotted ribs 18 which engage and align the vanes 14 of the adjacent louver elements.

A similar arrangement of dual directional control of light using the louver elements 20 is illustrated in FIGURE 7. In this instance the adapter louver 60 is V-shaped in cross section with the apex of the V inward. The outside or trough of the adapter louver 60 is provided with vanes 62 to continue the cellular pattern smoothly between the opposed groups of louver elements 20 and 20. Both sides of the adapter louver 60 have slotted ribs 28 to maintain alignment of the vanes.

If it is desired to eliminate direct light and prevent any viewing of the lamps through the louvers, the louver elements may be modified as indicated in FIGURE 8. Instead of the plain plate 12, or the plate 22 as illustrated in FIGURE 8, the modified plate 64 is V-shaped in cross section with an inner flange 66 inclined in the opposite direction to the plate 22 which carries the vanes 14. The flange 66 is substantially equal in width to the vane carrying plate 22 and the inner edge 70 reaches to or even extends slightly axially beyond the apex of the next adjacent louver element, so that direct vision through the cells is blocked.

A further type of fixture, illustrated in section in FIGURE 9, uses semi-circular louver elements 72 which can be unitary or made from two quadrants. This fixture is suitable for mounting on a flat wall, ceiling, or other surface 74 with any convenient arrangement of lamps, either in vertical or horizontal position.

The fixture shown in FIGURE 10 uses three quarter circular louver elements 76 and will mount on an outside corner structure 78. These louver elements can also be unitary or assembled from quadrants.

The cover type fixture illustrated in FIGURES 11 and 12 has one quarter circle or quadrant louver elements 80 and fits into an inside corner 82. As illustrated the fixture uses louvers inclined in both directions, joined by an adapter louver 84 corresponding to a portion of adapter louver 60. This fixture can be mounted horizontally at the junction of a wall and ceiling, or vertically at the junction of two walls.

The various fixtures may also be assembled from the elements shown in FIGURE 15, in which the louver element 86 has a plate 88 with vanes 90 extending from both faces in opposed relation. When these elements are stacked, plain non-vaned spacer plates 92 are inserted between adjacent elements to form peripheral slats and continue the uniform cellular structure. To maintain alignment of the vanes through the stack each plate 88 has one or more inwardly projecting lugs 94 on its inner edge, through which tie rods 96 are passed to secure the assembly.

It should again be stressed that the term "cylindrical" is used in its broadest sense and is not intended to be limited to the circular or right cylindrical configurations thus far described. The louver elements may be multi-sided or polygonal with the vanes generally radial to the longitudinal axis of the structure. One example is illustrated in FIGURES 16 and 17, in which the louver element 98 is of square configuration and could be a unitary element or made from four sectors. In this louver element the plate 100 is of hollow frusto-pyramidal form, the term "pyramidal" being used broadly. Vanes 102 are shown as generally radial to the center of the square. Other shapes may be developed in a similar fashion.

Any of the fixtures described may be provided with weatherproofing in the form of the shield 54 or an appropriate portion thereof and any of the louver elements may be fitted with the shielding flanges 66.

It will be evident that a wide variety of fixtures may be built up from the basic louver elements. The resultant fixtures can be mounted on posts or walls as shown, or mounted directly on the floor, or even suspended from overhead supports.

It is understood that minor variation from the form of the invention disclosed herein may be made without departure from the spirit and scope of the invention, and that the specification and drawings are to be considered as merely illustrative rather than limiting.

I claim:
1. An elongated columnar light control unit comprising:
  a plurality of louver elements stacked one on the other in the direction of the longitudinal axis of the columnar unit;
  said louver elements each comprising a plate inclined to said axis and spaced therefrom to define a space for lighting equipment, and plate-like vanes each unitary with said plate and extending generally radially from said axis in planes parallel to said axis, the plates and vanes in the columnar unit alternating to form a cellular structure.
2. A light control unit according to claim 1 wherein said plate has said vanes on one face only of the plate and said vanes are unitary with the plate.
3. A light control unit according to claim 1 wherein said plate has said vanes on both faces of the plate, and said columnar unit includes non-vaned spacer plates between said louver elements.
4. A light control unit according to claim 1 wherein said louver elements have flanges extending toward said axis from the edges of said plates proximal to said axis and inclined oppositely to said plates.
5. A light control unit according to claim 1 wherein said louver elements have integral aligning means directly inter-engaging said louver elements.

6. A light control unit according to claim 5 wherein each said louver element is in a plurality of sections, and said means comprises sleeves on said sections and tie rods extending through said sleeves.

7. A light control unit according to claim 5 wherein said means comprises deformations on said plates engaging the vanes on the next adjacent louver element.

8. A light control unit according to claim 1 and including a unitary imperforate shield of light transmitting material extending longitudinally of the columnar unit in said space.

9. A light control unit according to claim 8 wherein said shield has portions thereof reflective for directional control of emitted light.

References Cited

UNITED STATES PATENTS

| | | | |
|---|---|---|---|
| 1,694,491 | 12/1928 | Smith | 240—46.43 |
| 2,363,374 | 11/1944 | Weyer | 240—78 |
| 2,387,816 | 10/1945 | Wagner | 240—46.41 |

FOREIGN PATENTS

| | | |
|---|---|---|
| 308,625 | 3/1929 | Great Britain. |

NORTON ANSHER, *Primary Examiner.*

D. L. JACOBSON, JOSEPH F. PETERS, JR.,
*Assistant Examiners.*